US008636959B2

(12) United States Patent
Ando et al.

(10) Patent No.: US 8,636,959 B2
(45) Date of Patent: Jan. 28, 2014

(54) SELECTIVE CATALYTIC REDUCTION TYPE CATALYST, AND EXHAUST GAS PURIFICATION EQUIPMENT AND PURIFYING PROCESS OF EXHAUST GAS USING THE SAME

(75) Inventors: Ryuji Ando, Numazu (JP); Takashi Hihara, Numazu (JP); Yasuharu Kanno, Numazu (JP); Makoto Nagata, Numazu (JP)

(73) Assignee: N.E. Chemcat Corporation, Tokyo (JP)

( * ) Notice: Subject to any disclaimer, the term of this patent is extended or adjusted under 35 U.S.C. 154(b) by 337 days.

(21) Appl. No.: 12/662,147

(22) Filed: Apr. 1, 2010

(65) Prior Publication Data
US 2010/0196221 A1 Aug. 5, 2010

Related U.S. Application Data

(63) Continuation-in-part of application No. 12/149,575, filed on May 5, 2008, now Pat. No. 7,906,449.

(30) Foreign Application Priority Data

May 9, 2007 (JP) ................... 2007-124152

(51) Int. Cl.
*B01D 17/038* (2006.01)
*B01D 53/56* (2006.01)

(52) U.S. Cl.
USPC ........ 422/170; 422/171; 422/172; 423/213.2; 423/213.5; 502/64; 502/65; 502/66; 502/67; 502/69; 502/73; 502/74; 502/527.12

(58) Field of Classification Search
USPC .................... 422/170–172; 423/213.2, 213.5; 502/64–67, 69, 73, 74, 527.12
See application file for complete search history.

(56) References Cited

U.S. PATENT DOCUMENTS 5,409,671 A  4/1995 Takemoto et al.
2001/0053340 A1 12/2001 Noda et al.
2010/0058746 A1 3/2010 Pfeifer et al.

FOREIGN PATENT DOCUMENTS

EP  1166854  1/2002
JP  3012249  12/1989

(Continued)

OTHER PUBLICATIONS

Lambert et al. "Urea SCR and DPF System for Tier 2 Diesel Light-Duty Trucks." Diesel Exhaust Aftertreatment Ford Research and Advanced Engineering. Aug. 24, 2006.*

(Continued)

*Primary Examiner* — Brian Walck
(74) *Attorney, Agent, or Firm* — Edwards Wildman Palmer LLP; James E. Armstrong, IV; Nicholas J. DiCeglie, Jr.

(57) ABSTRACT

The present invention is an exhaust gas purification catalyst equipment, and a method of use thereof, formed by arranging a selective catalytic reduction type catalyst for purifying nitrogen oxides in exhaust gas exhausted from lean combustion engines using ammonia or urea as a reducing agent, it is provided with a selective catalytic reduction type catalyst, characterized in that said catalyst comprises a lower-layer catalyst layer (A) having an oxidative function for nitrogen monoxide (NO) in exhaust gas and an upper-layer catalyst layer (B) having an adsorbing function for ammonia on the surface of a monolithic structure type carrier (C), and that the lower-layer catalyst layer (A) comprises a noble metal component (i), an inorganic base material constituent (ii) and zeolite (iii), and the upper-layer catalyst layer (B) comprises substantially none of component (i) but the component (iii), in a flow path of exhaust gas, characterized in that a spraying means to supply an urea aqueous solution or an aqueous ammonia solution is arranged in the downstream of the aforementioned oxidation catalyst and in the upstream of aforementioned selective catalytic reduction type catalyst.

12 Claims, 2 Drawing Sheets

(56) References Cited

FOREIGN PATENT DOCUMENTS

| | | |
|---|---|---|
| JP | 10-005591 | 1/1998 |
| JP | 2002-502927 | 1/2002 |
| JP | 2004-524962 | 8/2004 |
| JP | 2005-238195 | 9/2005 |
| WO | WO-98/50151 | 11/1998 |
| WO | WO-2007/137675 | 12/2007 |
| WO | WO-2008/006427 | 1/2008 |

OTHER PUBLICATIONS

European Search Report dated Aug. 4, 2008, issued on the corresponding European application.

\* cited by examiner

SELECTIVE CATALYTIC REDUCTION TYPE CATALYST, AND EXHAUST GAS PURIFICATION EQUIPMENT AND PURIFYING PROCESS OF EXHAUST GAS USING THE SAME

This application is a Continuation-in-Part application of U.S. application Ser. No. 12/149,575, filed May 5, 2008, and claims the right of priority under 35 U.S.C. §119 based on Japanese Patent Application No. 2007-124152 filed May 9, 2007, which is hereby incorporated by reference herein in its entirety as if fully set-forth herein.

TECHNICAL FIELD

The present invention relates to a selective catalytic reduction type catalyst, and an exhaust gas purification equipment and a purifying process of exhaust gas using the same. In more detail, the present invention relates to a technology to purify nitrogen oxides contained in exhaust gas exhausted from lean combustion engines such as diesel engines with ammonia and a selective catalytic reduction catalyst, and provides a selective catalytic reduction type catalyst which can effectively purify nitrogen oxides even at a low temperature as well as inhibit leaking of ammonia, and an exhaust gas purification equipment and a purifying process of exhaust gas using the same.

BACKGROUND ART

In exhaust gas exhausted from combustion engines such as lean-burn type gasoline engines, diesel engines, various harmful substances derived from fuel and combustion air are contained depending on their structures and types. These harmful substances include hydrocarbons (HC), soluble organic fraction (also referred to as SOF), soot, carbon monoxide (CO), nitrogen oxides ($NO_x$), and the like, and these substances are regulated by the Clean Air Act. And as a purification method for these substances, a contact treatment process in which exhaust gas is purified by contacting with a catalyst has been practically used.

In addition, in such a lean combustion engine, combustion temperature is controlled by such a procedure that an optimum amount of air for combustion is supplied corresponding to a type and feed rate of fuel, to inhibit amounts of harmful substances to be generated. However, it is not that, in all type of combustion engines, air and fuel can be always controlled in an ideal state, and large amounts of harmful substances such as nitrogen oxides are sometimes generated due to incomplete combustion. Such circumstances are same in internal combustion engines, and in the case of diesel engines, nitrogen oxides tend to be exhausted because it has a structure in which the engine is operated by lean combustion. Among them, in the case of a diesel engine that is mounted in an automobile, since its operation conditions always vary, it had been particularly difficult to properly inhibit generation of harmful substances.

Among the harmful substances exhausted in such way, as a means to purify (denitrate) $NO_x$, a technology has been studied in which $NO_x$ is contacted with a catalyst containing as main components titanium oxide, vanadium oxide, zeolite, and the like under the presence of an ammonia ($NH_3$) component, to be reduced and denitrated. The catalyst to be used for this purpose is known as Selective Catalytic Reduction Catalyst (hereinafter, also referred to as SCR).

In this SCR catalyst using this $NH_3$ component as a reducing agent, $NO_x$ is finally reduced to $N_2$ mainly by the reaction equations (1) to (3) shown below.

$$4NO+4NH_3+O_2 \rightarrow 4N_2+6H_2O \tag{1}$$

$$2NO_2+4NH_3+O_2 \rightarrow 3N_2+6H_2O \tag{2}$$

$$NO+NO_2+2NH_3 \rightarrow 2N_2+3H_2O \tag{3}$$

In a denitration catalyst system utilizing such reaction mechanisms, gasified $NH_3$ may be used as a reducing component, but $NH_3$ itself has harmful effects such as an irritating odor, etc. Therefore, such a system has been proposed that an urea aqueous solution as a $NH_3$ component is added in the upstream of denitration catalyst to generate $NH_3$ by thermal decomposition or hydrolysis and exert denitration performance as a reducing agent by the reactions of the above equations.

The reactions to obtain $NH_3$ by decomposition of urea in such way are represented by the following equations.

$$NH_2-CO-NH_2 \rightarrow NH_3+HCNO \text{ (thermal decomposition of urea)}$$

$$HCNO+H_2O \rightarrow NH_3+CO_2 \text{ (hydrolysis of isocyanic acid)}$$

$$NH_2-CO-NH_2+H_2O \rightarrow 2NH_3+CO_2 \text{ (hydrolysis of urea)}$$

In the purification of $NO_x$ in exhaust gas, in the denitration reactions (1) to (3), molar ratio of $NH_3/NO_x$ should be 1.0 in theory, but $NH_3$ has sometimes to be supplied in a higher $NH_3/NO_x$ ratio to obtain a sufficient purification performance for $NO_x$, in the case of a transitional operation condition during operation of a diesel engine or in the case of inadequate space velocity or gas temperature. In such case, a risk had been pointed out that unreacted $NH_3$ leaks out (hereinafter, also referred to as slip or $NH_3$-slip) and causes a secondary pollution such as environmental pollution.

On the basis of these problems, various catalyst technologies had been studied as SCR (see: JP-A-2004-524962). In addition, in order to purify $NH_3$ slipped from SCR, such a process had been studied that the slipped $NH_3$ is purified by oxidation as shown by the following reaction equation (4) by placing a $NH_3$-purification catalyst in which platinum (Pt), palladium (Pd), rhodium (Rh), or the like is supported on a base material of alumina or the like, in the subsequent stage of SCR.

$$2NH_3+3/2O_2 \rightarrow N_2+3H_2O \tag{4}$$

However, since the above-described catalyst to purify $NH_3$ uses a noble metal component having a high oxidizing ability such as platinum, palladium, rhodium as a catalytically active species, there was a problem that the catalyst could cause the new generation of $NO_x$ component such as $N_2O$, NO, $NO_2$ in addition to the oxidation of $NH_3$, as shown by the following reaction equations (5) to (7).

$$2NH_3+5/2O_2 \rightarrow 2NO+3H_2O \tag{5}$$

$$2NH_3+7/2O_2 \rightarrow 2NO_2+3H_2O \tag{6}$$

$$2NH_3+2O_2 \rightarrow NO_2+3H_2O \tag{7}$$

In order to inhibit such generation of $NO_x$, a purification catalyst having a slipped $NH_3$ measure has been proposed, in which a component having an oxidative decomposition activity for $NH_3$ in a lower layer and one or more types of oxides selected from titanium, tungsten, molybdenum and vanadium which do not have an oxidative decomposition activity for NH$_3$ in an upper layer are laminated as a denitratively active component (see: JP-A-10-5591). According to JP-A-10-5591, a thin catalyst layer having only a denitration activity has been formed on a surface layer, where firstly a denitration reaction proceeds and most of NO and NH$_3$ are utilized in the denitration reaction. Thereafter, remaining NH$_3$ and NO diffuse to an inner part of the catalyst, and reach to an inside layer of the catalyst (inner layer) having a denitration activity and an oxidative activity. In this case, since NH$_3$ is present in large a excess against NO in the inner layer, not only oxidative decomposition of NH$_3$ but also denitration reaction can be promoted. It has been reported that only a final surplus NH$_3$ is oxidatively decomposed by a noble metal-supported component in the inner layer, and an additional generation of NO$_x$ can be inhibited by purification of slipped NH$_3$. The catalyst in JP-A-10-5591 uses vanadium as an essential component which has a high reaction efficiency, and has been thought to be a useful denitration component. However, vanadium itself is a harmful heavy metal, and its use is not desirable because of a fear that it could vaporize into exhaust gas when used as a catalyst, therefore, some automobile catalyst manufacturers avoid using it.

In addition, a process has been studied in which a catalyst for purifying NH$_3$ slipped from SCR in the subsequent stage of a selective catalytic reduction catalyst (SCR) is placed in order to purify slipped NH$_3$ (see: JP-A-2005-238195 and JP-A-2002-502927). Although purification of slipped NH$_3$ proceeds by arranging a catalyst to oxidize NH$_3$ in the subsequent stage in such a way, the process is accompanied by a risk that additional NO$_x$ is generated due to a presence of a highly active noble metal catalyst on the surface of the carrier, and cannot be regarded as satisfying one against the regulation for NO$_x$ which is becoming increasingly severe in recent years.

In addition, for such problem, in order to prevent the generation of additional NO$_x$ in purification of slip NH$_3$ without using vanadium as a catalyst component, it is considered to increase a volume of SCR by which NH$_3$ is consumed. Although catalytic reaction is promoted in proportion to the surface area of a catalyst, the volume of catalyst to be loaded and its placement are limited in the case of automobile use, therefore, the measure to increase simply a volume of catalyst cannot be said to be a practical solution.

In addition, a technology has been proposed in which a combustible particle component such as soluble organic fraction, soot in exhaust gas is purified together with purification of NO$_x$ (see: JP-A-2002-502927). The combustible particle component is filtered out from exhaust gas using a filter. The filtered out combustible particle component deposits on the filter, and leads to the clogging of the filter, if the component is kept as it is. Therefore, the combustible particle component deposited on the filter is removed by combusting. For such combustion, oxygen and NO$_2$ in exhaust gas are utilized. In the case of using NO$_2$, combustion of the combustible particle component can proceed even at such a low temperature as of exhaust gas from diesel engines (see: JP No. 3012249).

However, since the combustion of combustible particle component is oxidation reaction even when NO$_2$ is used, and a large amount of NO is contained in the exhaust gas exhausted after the combustion, some purification means for NO$_x$ is required in this method also. Therefore, purification of NO$_x$ is carried out in the subsequent stage of the combustion of combustible particle component by a filter by arranging SCR in the subsequent stage of the filter.

As described above, in the conventional NH$_3$—SCR technologies, there is no catalyst which can inhibit generation of additional NO$_x$ and simultaneously provides a sufficient NO$_x$ purification performance and a slip NH$_3$ purification performance, and a catalyst which has these performances all together has been earnestly desired.

[Patent Literature 1]: JP-A-2004-524962 (Claim 10);
[Patent Literature 2]: JP-A-10-5591 (Claim 1, Claim 17, [0022] and [0023]);
[Patent Literature 3]: JP-A-2005-238195 (Claim 1, [0009], and [0061]);
[Patent Literature 4]: JP-A-2002-502927 (Claim 1 and [0013]);
[Patent Literature 5]: JP No. 3012249.

DISCLOSURE OF INVENTION

Problem to be Solved by the Invention

In view of the above-described conventional problem, the present invention relates to a technology for purifying nitrogen oxides contained in exhaust gas exhausted from lean combustion engines such as diesel engines with ammonia and a selective catalytic reduction catalyst. An object of the present invention is to provide a selective catalytic reduction type catalyst which can effectively purify nitrogen oxides even at a low temperature as well as inhibits the leaking of ammonia, and an exhaust gas purification equipment and a purifying process of exhaust gas using the same.

Means for Solving the Problem

The present inventors have intensively studied a way to solve the above-described problem, as a result, have found out a catalyst which uses a safe material as a denitration component and purifies NO$_x$ component using NH$_3$ component as a reducing agent, wherein a layer containing a noble metal component such as platinum and zeolite is formed on a monolithic structure type carrier, and thereon another layer containing no noble metal component but zeolite is coated, and a purifying process of exhaust gas using the same. The inventors have also confirmed that, according to this catalyst technology, NO$_x$ can be purified even at a comparatively low temperature where catalytic activity can be hardly obtained, and slipped NH$_3$ or generation of NO$_x$ accompanied to purification of slip NH$_3$ can be inhibited, and finally accomplished the present invention.

Namely, according to the first aspect of the present invention, the present invention provides a selective catalytic reduction type catalyst for purifying nitrogen oxides in exhaust gas exhausted from lean combustion engines using ammonia or urea as a reducing agent, characterized in that the catalyst comprises a lower-layer catalyst layer (A) having an oxidative function for nitrogen monoxide (NO) in exhaust gas and an upper-layer catalyst layer (B) having an adsorbing function for ammonia on the surface of a monolithic structure type carrier (C), and that the lower-layer catalyst layer (A) comprises the following components of (i), (ii) and (iii), on the other hand, the upper-layer catalyst layer (B) comprises substantially none of the following component (i) but the component (iii):
(i) one or more kinds of noble metals selected from platinum, palladium and rhodium;
(ii) one or more kinds of oxides selected from alumina, titania, silica, zirconia, tungsten oxide, transition metal oxides, rare earth oxides, or composite oxide thereof; and
(iii) zeolite."

In addition, according to the second aspect of the present invention, the present invention provides a selective catalytic reduction type catalyst, characterized in that, in the first aspect, the component (i) in the lower-layer catalyst layer (A) contains platinum as a noble metal, and content thereof per unit volume of the monolithic structure type carrier (C) is 0.05 to 3 g/L.

In addition, according to the third aspect of the present invention, the present invention provides a selective catalytic reduction type catalyst, characterized in that, in the first or the second aspect, content of the component (ii) in the lower-layer catalyst layer (A) per unit volume of the monolithic structure type carrier (C) is 5 to 80 g/L.

In addition, according to the fourth aspect of the present invention, the present invention provides a selective catalytic reduction type catalyst, characterized in that, in any one of the first to the third aspects, the component (iii) in the lower-layer catalyst layer (A) or the upper-layer catalyst layer (B) comprises a β-type zeolite and/or a MFI-type zeolite.

In addition, according to the fifth aspect of the present invention, the present invention provides a selective catalytic reduction type catalyst, characterized in that, in any one of the first to the fourth aspects, the component (iii) in the lower-layer catalyst layer (A) or the upper-layer catalyst layer (B) comprises at least one kind of iron component or cerium component.

Further, according to the sixth aspect of the present invention, the present invention provides a selective catalytic reduction type catalyst, characterized in that, in any one of the first to the fifth aspects, content of the component (iii) in the lower-layer catalyst layer (A) per unit volume of the monolithic structure type carrier (C) is 5 to 80 g/L.

Further, according to the seventh aspect of the present invention, the present invention provides a selective catalytic reduction type catalyst, characterized in that, in any one of the first to the sixth aspects, the lower-layer catalyst layer (A) or the upper-layer catalyst layer (B) further comprises the following component (iv) as a catalytic promoter component:

"(iv) one or more kinds of oxides selected from rare earth oxides, transition metal oxides, tin oxide, or composite oxides thereof".

Further, according to the eighth aspect of the present invention, the present invention provides a selective catalytic reduction type catalyst, characterized in that, in any one of the first to the seventh aspects, thicknesses of the lower-layer catalyst layer (A) and the upper-layer catalyst layer (B) are each substantially in a range from 5 to 200 μm.

On the other hand, according to the ninth aspect of the present invention, the present invention provides a selective catalytic reduction type catalyst, characterized in that, in any one of the first to the eighth aspects, the lower-layer catalyst layer (A) is coated on the monolithic structure type carrier (C), and directly thereon the upper-layer catalyst layer (B) is coated so as to be a top layer which directly contacts with the aforementioned exhaust gas flow.

Further, according to the tenth aspect of the present invention, the present invention provides a selective catalytic reduction type catalyst, characterized in that, in any one of the first to the ninth aspects, content of the component (iii) in the upper-layer catalyst layer (B) per unit volume of the monolithic structure type carrier (C) is 10 to 160 g/L.

On the other hand, according to the eleventh aspect of the present invention, relating to anyone of the first to the tenth aspects, the present invention provides an exhaust gas purification catalyst equipment formed by arranging an oxidation catalyst (DOC) having an oxidative function for nitrogen monoxide and hydrocarbon and aforementioned selective catalytic reduction type catalyst (SROC) having an oxidative function layer in the subsequent stage thereof, in a flow path of exhaust gas, characterized in that a spraying means to supply an urea aqueous solution or an aqueous ammonia solution is arranged in the downstream of the aforementioned oxidation catalyst and in the upstream of aforementioned selective catalytic reduction type catalyst.

In addition, according to the twelfth aspect of the present invention, relating to the eleventh aspect, the present invention provides an exhaust gas purification catalyst equipment, characterized in that a selective catalytic reduction (SCR) catalyst having substantially no oxidative function layer is further arranged in the upstream of the aforementioned selective catalytic reduction type catalyst (SROC) having an oxidative function layer and in the downstream of the aforementioned spraying means.

Further, according to the thirteenth aspect of the present invention, relating to the eleventh aspect, the present invention provides a purifying process of exhaust gas, characterized by comprising, using the aforementioned exhaust gas purification catalyst equipment; passing exhaust gas exhausted from lean combustion engines through the aforementioned oxidation catalyst (DOC) to convert nitrogen monoxide in exhaust gas to nitrogen dioxide; subsequently supplying by spraying an urea aqueous solution or an ammonia component thereto; then passing the exhaust gas through the aforementioned selective catalytic reduction type catalyst (SROC) to reduce and purify nitrogen oxides in exhaust gas.

In addition, according to the fourteenth aspect of the present invention, relating to the twelfth aspect, the present invention provides a purifying process of exhaust gas, characterized by comprising, using the aforementioned exhaust gas purification catalyst equipment; passing exhaust gas exhausted from lean combustion engines through the aforementioned oxidation catalyst (DOC) to convert nitrogen monoxide in exhaust gas to nitrogen dioxide; subsequently supplying by spraying an urea aqueous solution or an ammonia component thereto; then passing the exhaust gas through the aforementioned selective catalytic reduction catalyst (SCR) to reduce nitrogen oxides in the exhaust gas; further passing the exhaust gas through the aforementioned selective catalytic reduction type catalyst. (SROC) to oxidize and purify surplus ammonia in the exhaust gas.

Effect of Invention

According to the selective catalytic reduction type catalyst having an oxidative function layer of the present invention, a superior purification performance for $NO_x$ in exhaust gas exhausted from various types of lean combustion engines can be obtained, at the same time, slipped $NH_3$ can be purified in high efficiency even when an $NH_3$ component is used as a reducing agent, and furthermore, generation of additional $NO_x$ accompanied to oxidation of $NH_3$ can be inhibited. Even when the temperature of exhaust gas is low, superior $NO_x$ purifying performance and $NH_3$ purifying performance can be obtained. In addition, safety of the catalyst is very high, because any harmful heavy metal such as vanadium is not contained therein as a catalyst component.

In addition, when oxidation catalyst (DOC) for oxidizing NO to $NO_2$ at the preceding stage of this selective catalytic reduction catalyst is arranged, $NO_x$ purifying performance can be further enhanced. Further, by combination of oxidation catalyst (DOC), Filter (DPF) and this selective catalytic reduction catalyst, the combustible particle components deposited on DPF are combusted and DPF is regenerated, and further, NO is generated from DPF, $NO_x$ is passed DPF and slip $NH_3$ can be purified.

BEST MODE FOR CARRYING OUT THE INVENTION

Figure 1:
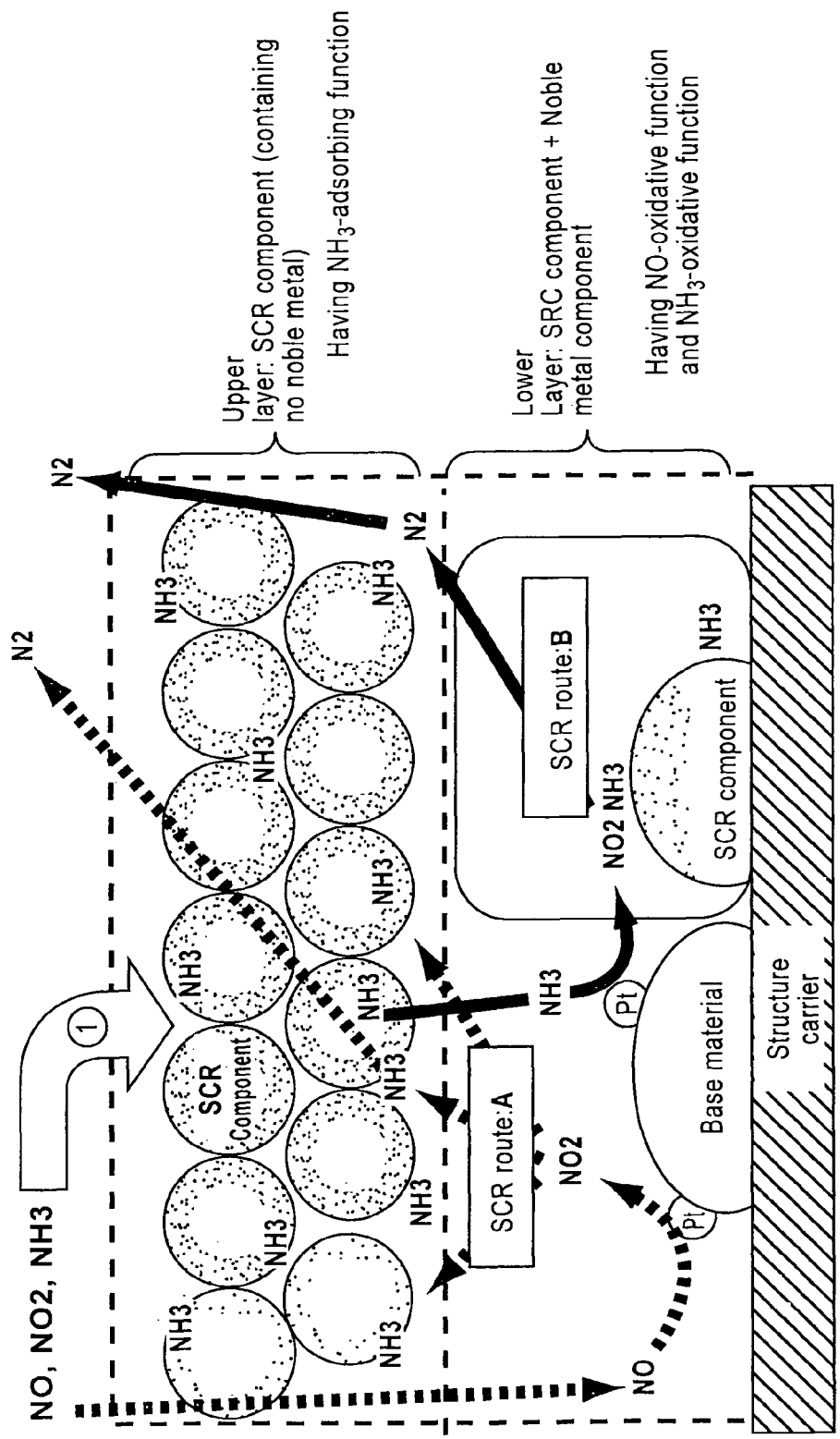
FIG. 1 is a pattern diagram showing basic configuration of the present invention and assumed reaction routs.

Hereinafter, the selective catalytic reduction type catalyst of the present invention, and the exhaust gas purification equipment and the purifying process of exhaust gas using the same will be explained in detail, by mainly diesel engines for automobile as an example, using drawings. However, the present invention is not limited to the use for automobile and is also widely applicable to a technology for removing nitrogen oxides in exhaust gas and purification of slip $NH_3$. In addition, although light oil is assumed as a fuel to be used, the present invention may be applied to exhaust gas exhausted from combustion engines using, besides light oil, gasoline, heavy oil and biofuel such as alcohol, and also mixed fuel such as biofuel plus light oil and biofuel plus gasoline. The present invention also exhibits an effect when it is applied to an exhaust gas purification catalyst equipment involving regeneration of a filter on which combustible particle component is deposited.

1. Selective Catalytic Reduction Type Catalyst

The selective catalytic reduction type catalyst of the present invention is a selective catalytic reduction catalyst having an oxidative function layer (hereinafter, also referred to as Selective Reduction Oxidation Catalyst (SROC)), which is a selective catalytic reduction type catalyst to purify nitrogen oxides in exhaust gas exhausted from lean combustion engines using an $NH_3$ component such as ammonia, urea as a reducing agent, characterized in that the catalyst comprises, a lower-layer catalyst layer (A) having an oxidative function for nitrogen monoxide (NO) in exhaust gas and an upper-layer catalyst layer (B) having an adsorbing function for ammonia on the surface of a monolithic structure type carrier (C), and that the lower-layer catalyst layer (A) comprises the following components of (i), (ii) and (iii), and the upper-layer catalyst layer (B) comprises substantially none of the following component (i) but the component (iii):

"(i) one or more kinds of noble metals selected from platinum, palladium and rhodium;

(ii) one or more kinds of oxides selected from alumina, titania, silica, zirconia, tungsten oxide, transition metal oxides, rare earth oxides, or composite oxide thereof; and (iii) zeolite."

(A) Lower-Layer Catalyst Layer

The lower-layer catalyst layer (A) of the present invention comprises a noble metal component as an essential component, and specifically platinum, palladium, rhodium, and the like are preferable.

Among them, platinum can be used as a main noble metal component because it has a high oxidative activity and exhibits a superior $NH_3$-purification performance. Here, a main noble metal component means a component to be contained in a content of 50% by weight or more relative to the total amount of noble metals to be used in the catalyst of the present invention, and the case where platinum is all of the noble metals may be included.

In this case, when the lower-layer catalyst layer component of the present invention is coated on a monolithic structure type carrier, amount of platinum to be used per unit volume of the monolithic structure type carrier is preferably 0.05 to 3 g/L, and more preferably 0.1 to 2 g/L. In an amount less than 0.05 g/L, an activity of platinum cannot be fully utilized, and even in an amount over 3 g/L, more improvement in the effect cannot be expected.

As a catalyst component forming the lower-layer catalyst layer, the noble metals, particularly, Pt and Pd exhibit a superior oxidizing performance. Among them, Pt is a catalytically active species having a superior oxidizing ability, and can increase the active surface and exhibit a high activity by maintaining its specific surface area high.

Therefore, the component (ii), that is, one kind of transition metal oxides such as alumina, titania, silica, zirconia, tungsten oxide, rare earth oxides such as cerium oxide, lanthanum oxide, or composite oxides thereof, is used as a base material, and the noble metal component (i) of the present invention is supported on these base materials. It should be noted that, since these base materials can support noble metals in a highly dispersed state and have a high heat resistance in the case of particle, and these base materials make the catalyst component (i) difficult to be sintered, the highly dispersed state of noble metals can be maintained for a long period of time.

Thus, the noble metal component has a high specific surface area and is supported in a highly dispersed state on an inorganic base material which is superior in heat resistance, but the above-described inorganic base materials have been used until now (for example, JP-A-2006-21141, Claim 5, [0019]). Among them, titania or a composite oxide of titania and other inorganic oxide is preferably used in the present invention. As a composite oxide of titania and other inorganic oxide, titania-silica, titania-alumina and titania-tungsten can be used. For such titania-containing composite oxides, improvement of denitration performance, improvement of heat resistance, improvement of sulfur-poisoning-resistance performance, improvement of low temperature activity at 200° C. or lower, etc. can be expected. Concerning improvement of sulfur-poisoning-resistance performance, besides titania-containing composite oxides, silica-alumina composite oxide is also a preferable material, and also concerning improvement of heat resistance, γ-alumina can be a preferable base material.

In view of dispersibility of the noble metal component, such inorganic base materials have a specific surface area (based on BET method, hereinafter same as above) of preferably 30 $m^2/g$ or more, and more preferably 90 $m^2/g$ or more. With a specific surface area of 30 $m^2/g$ or more, the noble metal can be stably supported in a highly dispersed state.

A method for supporting a noble metal on such inorganic base materials can be carried out by a known method as appropriate, for example, an aqueous solution of metal salt such as platinic (IV) chloride, diammine platinum (II) nitrite, hydroxyplatinic acid amine solution, platinic chloride, dinitrodiammine palladium, palladium nitrate, palladium chloride, rhodium (III) chloride, rhodium (III) nitrate is mixed with an inorganic base material, then the mixture is dried and calcined etc.

In addition, as for the lower layer coated on the monolithic structure type carrier of the present invention, besides the above-described inorganic base materials, one kind of oxide of transition metal oxides such as titania, zirconia, tungsten oxide, rare earth oxides such as ceria, lanthanum, praseodymium, samarium, gadolinium, neodymium, base metal oxides such as gallium oxide, tin oxide, or composite oxide thereof, and the like can be added as a catalytic promoter component. Composite oxide containing titania, tungsten oxide or zirconia has a solid acidity, and not only exhibits a selective catalytic reduction activity by $NH_3$ but also has an action to promote thermal decomposition and hydrolysis at a low temperature for urea as an NH₃ component. Action of tin oxide or other transition metal, rare earth oxides is not clear, but it is thought to improve the catalyst performance of the present invention by contributing to adsorption and oxidation of $NO_x$.

As such a catalytic promoter component, cerium compounds are preferable and usually used as an oxide thereof, and these compounds may be pure cerium oxide, or may be composite oxide of cerium and a transition metal such as zirconium, composite oxide of cerium and aluminum, or composite oxide of cerium and rare earths such as lanthanum, praseodymium, samarium, gadolinium, neodymium.

Although the reason why such cerium compounds are effective as a catalytic promoter in the $NO_x$ purification catalyst is not clear, it is thought that since cerium compounds are known as an Oxygen Storage Component (also referred to as OSC), and by using such OSC in the selective catalytic reduction type catalyst of the present invention, $NO_x$ is adsorbed, chance contacting with other catalyst components is increased, and reaction is promoted, due to the oxygen-storing ability possessed by OSC.

In addition, since a cerium compound as an oxide and $NO_x$ are relatively in a relation of acid and base, it is considered that $NO_x$ is also adsorbed by OSC due to this relation, chance contacting with other catalyst components is increased, and reaction is promoted.

When a catalytic promoter is used, amount thereof to be compounded to amount of the catalyst composition is preferably 0.1 to 10% by weight (in oxide equivalent), and more preferably 0.5 to 4% by weight. An amount of the catalytic promoter component over 10% by weight could cause that an improvement of purification performance corresponding to the addition amount cannot be expected, and an amount less than 0.1% by weight could lead to no improvement in purification performance for exhaust gas.

Content of the component (ii) in the lower-layer catalyst layer (A) per unit volume of the monolithic structure type carrier (C) is 5 to 80 g/L, and particularly desirably 15 to 60 g/L. This is because of the following reason, namely an excess amount of the component (ii) enhances dispersibility of Pt and enhances oxidizing ability for NH₃ too much, resulting in sometimes an increased emission of $NO_x$. Contrary, too small amount of the base material cannot promote oxidation of NH₃ and could cause NH₃-slip.

In addition, in the catalyst forming this lower layer, various types of zeolite component (iii) which exhibit a superior denitration performance by NH₃ are used. Type of the zeolite component (iii) is not particularly limited and can be selected as appropriate, but β-type and MFI-type of zeolite which have a three-dimensional pore structure are preferable. In particular, β-type zeolite is preferable from the viewpoints of having such properties as superior cation diffusion in ion exchange and superior diffusion of gas molecules such as NH₃, due to having a comparatively complicated three-dimensional pore structure which is composed of linear pores having comparatively large diameters and aligned in one direction and curved pores crossing thereto.

Zeolite has acid points where a basic compound such as NH₃ can be adsorbed thereto, and number of the acid points varies depending on molar ratio of Si/Al. Generally, a lower Si/Al ratio gives more acid points, but it is said that zeolite having a low Si/Al ratio shows a large degree of deterioration in durability in the presence of steam, contrary, zeolite having a high Si/Al ratio shows superior heat resistance. In the NH₃-selective catalytic reduction type catalyst of the present invention, since NH₃ is adsorbed on an acid point and the point becomes an active point to reduce and remove nitrogen oxides such as $NO_2$, it is thought that the zeolite having more acid points (a lower Si/Al ratio) is more advantageous for denitration reaction. Thus, as for the Si/Al ratio, durability and activity is in a relation of trade off, and considering these situations, Si/Al ratio of zeolite is preferably 5 to 500, more preferably 10 to 100, and further more preferably 15 to 50. Such character is similarly said in other types of zeolite such as β-type, MFI-type.

In comparison of characteristics of β-type and MFI-type of zeolite by NH₃-TPD, MFI-type is superior in adsorbing capacity and capable of holding NH₃ up to a high temperature. In the practical use environment of diesel engines, response to transitional variation in temperature or amount of exhaust gas during operation of engines and variation in spraying amount of NH₃ component can be carried out in a wide range by mixing β-type and MFI-type to be used in NH₃-selective catalytic reduction catalyst. In this case, component ratio represented by β-type/MFI-type is preferably 0.1 to 10, and more preferably 0.2 to 5.

In addition, as the solid acid point of zeolite, a cation exists as a counter ion. As the cation, ammonium ion and proton are generally known. In the present invention, type of the cation is not particularly limited, and besides ammonium ion and proton, transition metal elements, rare earth metal elements and noble metal elements can be used, among them, iron element or cerium element is preferable. In this case, iron element or cerium element may be used alone or in combination of both relative to zeolite, or alternatively iron element or cerium element may be contained in the zeolite component in an amount over ion-exchange capacity or as an oxide in addition to an ion-exchanged element.

Thus, iron element or cerium element can be added to zeolite, but it is not clear why performance is improved by using the zeolite which is ion-exchanged with iron element or cerium element, although this is a matter for speculation, it is thought that the zeolite ion-exchanged with iron element or cerium element oxidizes NO to $NO_2$ on its surface to increase reactivity with NH₃, and stabilizes framework structure of the zeolite to improve its heat resistance. Addition amount of the ion-exchange species to zeolite is preferably 0.01 to 5% by weight, and more preferably 0.2 to 2.0% by weight.

In the present invention, 2 types or more of zeolite may be used, when β-type or MFI-type of zeolite is used, β-type or MFI-type of zeolite may be combined with one or more types from various types of zeolite such as zeolite A, X, Y, MOR. However, in the whole amount of zeolite contained in a catalyst, ratio of total β-type or MFI-type is preferably 50 to 100%.

In the present invention, preferably β-type of zeolite has a composition in which its unit cell composition is represented by the following average composition formula, and is classified as a synthetic zeolite having tetragonal system.

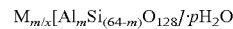

$$M_{m/x}[Al_m Si_{(64-m)} O_{128}] \cdot p H_2 O$$

(wherein, M represents a cation species; x represents valency of the aforementioned M; m represents a number more than 0 and less than 64; and p represents a number of 0 or more.)

In addition, as described before, β zeolite has a comparatively complicated three-dimensional pore structure which is composed of linear pores having comparatively large diameters and aligned in one direction and curved pores crossing thereto, and also has properties such as superior diffusion of cation in ion-exchange, superior diffusion of NH₃ gas molecule in reduction, and the like. This structure is a unique one compared with mordenite, faujasite, etc. which have only linear pores aligned in one direction, because of such complicated pore structure, β zeolite hardly has structural destruction by heat and has a high stability against heat.

Rate of ion-exchange by iron element in β zeolite is, based on the fact that one iron element (ion) and two units of the above [$AlO_{4/2}$] which is a monovalent ion-exchange site of zeolite forms an ion pair, preferably represented by the following formula (1).

[Number of moles of iron ion contained in unit weight of zeolite by ion-exchange/{(Number of moles of $Al_2O_3$ present in unit weight of zeolite)×(½)}]× 100 (1)

In addition, rate of ion-exchange is preferably 10 to 100%, more preferably 12 to 92%, further more preferably 15 to 80%, and most preferably 30 to 70%. A rate of ion-exchange of 92% or less, more preferably 80% or less, and further more preferably 70% or less stabilizes framework structure of zeolite more, and improves heat resistance of catalyst and thus life of catalyst, and can provide a more stabilized catalytic activity. However, too low rate of ion-exchange such as less than 10% could fail to provide a sufficient denitration performance. It should be noted that, the case, where the rate of ion-exchange is 100%, means that all cation species in zeolite are ion-exchanged with iron ion. Thus, the ion-exchanged zeolite exhibits superior purification ability.

In addition, in the present invention, when zeolite is β zeolite containing zeolite enhanced with iron element and cerium element, contents of iron element and cerium element relative to zeolite are preferably 0.1 to 10% by weight (in oxide equivalent) as iron and 0.05 to 5% by weight (in oxide equivalent) as cerium, and more preferably 0.5 to 5% by weight as iron and 0.1 to 3% by weight as cerium. A content of iron element over 10% by weight is not preferable because sufficient number of solid acid points cannot be secured resulting in lowering of activity and also deterioration of heat resistance, whereas a content less than 0.1% by weight is also not preferable because sufficient $NO_x$ purification performance cannot be obtained and purification performance for exhaust gas is deteriorated. On the other hand, a content of cerium element over 5% by weight is not preferable because sufficient number of solid acid points cannot be secured, resulting in lowering of activity and also deterioration of heat resistance, whereas a content less than 0.05% by weight is also not preferable because HC poisoning inhibition effect is not enhanced and purification performance for exhaust gas is deteriorated.

When commercial product is used as a zeolite enhanced by iron element or cerium element, it is preferable to select one in which content of iron element or cerium element is in the above range.

As for zeolite added with iron element or cerium element, various grades of commercial products can be used, and they can be prepared in such a manner as described in the aforementioned JP-A-2004-524962 (JP-A-2005-502451), etc.

Namely, iron element or cerium element (hereinafter, also referred to as metal catalyst component) may be supported in pores or in the vicinity of pore entrance in the above-described β-zeolite, and method for supporting may be any one of ion-exchange and impregnation. In the present invention, at least a part of zeolite is desirably enhanced with ion-exchange by a metal catalyst component. By being appropriately ion-exchanged, the frame structure of zeolite is stabilized and the heat resistance of zeolite itself is improved. The metal catalyst component is not necessarily required to be ion-exchanged completely, but a part thereof may exist as an oxide.

Method for obtaining ion-exchanged zeolite is not particularly limited, and may be obtained by applying ion-exchange treatment to zeolite using an aqueous solution of a metal catalyst component compound (e.g. ferric nitrate) in the usual manner, then drying and calcining. Metal catalyst component compound is usually used in a form of nitrate salt, sulfate salt, carbonate salt, acetate salt, and the like. Further, calcination conditions are not particularly limited, and may be such conditions that zeolite in which a metal catalyst component is stably supported can be sufficiently obtained. Calcination temperature is preferably 300 to 1,200° C., and more preferably 400 to 800° C. As for heating means, known heating means such as electric furnace, gas furnace can be used.

It should be noted that, zeolite, regardless of its type, may contain other transition metals, rare earth metals or noble metals, and the like, in addition to the above-described iron element and cerium element. Specifically, these metals include transition metals such as nickel, cobalt, zirconium, copper; rare earth metals such as lanthanum, praseodymium, neodymium; noble metals such as gold, silver, platinum, palladium, rhodium; and the like.

Content of zeolite, which is the component (iii), is 5 to 80 g/L, and more preferably 15 to 60 g/L. When a content of zeolite is as low as less than 5 g/L, reaction of $NH_3$ and $NO_x$ slows down, and $NH_3$ contacting with Pt increases due to decreased $NH_3$ adsorption capacity, possibly resulting in acceleration of oxidation of $NH_3$ and increasing $NO_x$ emission. Contrary, such a high content of zeolite as over 80 g/L is not preferable because a load to engines becomes too high due to increased pressure loss.

In addition, in the present invention, a balance among oxidizing ability for NO, adsorption amount for $NH_3$ and reducing ability for $NO_x$ in the lower layer, and $NO_2$ concentration in $NO_x$ supplied from the lower layer to the upper layer, adsorption amount for $NH_3$ of the upper layer, and reducing ability for $NO_x$ of the upper layer are also important factors. Therefore, desirably zeolite of the component (iii) is contained in the upper layer in an amount more than double of that in the lower layer to have an appropriate inhibiting ability for gas diffusion. As for gas diffusion, the following factors are thought namely, zeolite is known to inhibit gas diffusion, but when an amount of zeolite in the upper layer is too small, gas diffusion in the upper layer decreases and an excess amount of NO is supplied to noble metal in the lower layer, thereby oxidation of NO by noble metal in the lower layer cannot catch up, and $NO_2$ concentration required for SCR cannot be increased, resulting in that efficient $NO_x$ purification could not be carried out.

In addition, when an amount of zeolite in the upper layer is small and gas diffusion is low, an amount of $NH_3$ to be supplied to the lower layer passing through the upper layer increases, and sometimes this $NH_3$ is oxidized by noble metal in the lower layer to generate a large amount of $NO_x$. The large amount of $NO_x$ thus generated cannot be purified by the catalyst of the present invention, allowing it to be exhausted to the atmosphere directly as $NO_x$.

In the present invention, the component (iii) zeolite is thought to be an essential component, but even when zeolite is not contained in the lower layer, a certain level of $NO_x$ purification function could be exhibited due to a NO oxidizing action of noble metal in the lower layer. However, since zeolite is an effective SCR component, the desired $NO_x$ purification performance cannot be exhibited without containing zeolite.

(B) Upper-Layer Catalyst Layer

The upper-layer catalyst layer contains various types of zeolite component (iii) as an essential component, and is composed without containing a noble metal component.

Content of the zeolite component (iii) is 10 to 160 g/L, and more preferably 30 to 120 g/L. When a content of zeolite is less than 10 g/L, reaction of $NH_3$ and $NO_x$ slows down, and $NH_3$ contacting with Pt increases due to decreased $NH_3$ adsorption capacity, resulting in acceleration of oxidation of $NH_3$ and increasing $NO_x$ emission. Contrary, a high content of zeolite over 160 g/L is not preferable because a load to engines becomes too high due to increased pressure loss.

In addition, as described above, in the present invention, a balance among oxidizing ability for NO, adsorption amount for $NH_3$ and reducing ability for $NO_x$ in the lower layer, $NO_2$ concentration in $NO_x$ supplied from the lower layer to the upper layer, adsorption amount for $NH_3$ of the upper layer, and reducing ability for $NO_x$ of the upper layer are also important factors. Therefore, desirably zeolite of the component (iii) is contained in the upper layer in an amount more than double of that in the lower layer to have an appropriate inhibiting ability for gas diffusion. As for gas diffusion, the following factors are thought namely, zeolite is known to inhibit gas diffusion, but when an amount of zeolite in the upper layer is too small, gas diffusion in the upper layer decreases and an excess amount of NO is supplied to noble metal in the lower layer, thereby oxidation of NO by noble metal in the lower layer cannot catch up, and $NO_2$ concentration required for SCR cannot be increased, resulting in that efficient $NO_x$ purification could not be carried out.

In addition, when an amount of zeolite in the upper layer is small and gas diffusion is low, an amount of $NH_3$ to be supplied to the lower layer passing through the upper layer increases, and sometimes this $NH_3$ is oxidized by noble metal in the lower layer to generate a large amount of $NO_x$. The large amount of $NO_x$ thus generated cannot be purified by the catalyst of the present invention, allowing it to be exhausted to the atmosphere directly as $NO_x$.

In the zeolite component (iii), one kind of transition metal oxide such as alumina, titania, silica, zirconia, tungsten oxide, and the like; rare earth oxides such as cerium oxide, lanthanum oxide, praseodymium oxide, samarium oxide, gadolinium oxide, neodymium oxide, and the like; or composite oxide thereof, which is the above component (ii), can be used as a catalytic promoter component or a binder, if necessary.

As such a catalytic promoter component, cerium compound is preferable. Cerium compound is an oxygen storage component (OSC), and usually used as an oxide as described above, the compound may be a pure cerium oxide, or may be a composite oxide of cerium and a transition metal such as zirconium; a composite oxide of cerium and aluminum; or a composite oxide of cerium and a rare earth element such as lanthanum, praseodymium, samarium, gadolinium, and neodymium.

By containing such a cerium compound as an OSC, $NO_x$ is adsorbed, chance to contact with other catalyst components is increased, and reaction is promoted, due to the oxygen-storing ability possessed by OSC. By containing an OSC in the upper layer of the catalyst of the present invention, a large amount of $NO_2$ can be stored by the upper layer having a high concentration of SCR component, and reaction with $NH_3$ can be promoted.

(C) Monolithic Structure Type Carrier

The monolithic structure type carrier is not particularly limited, and besides a honeycomb structure type carrier, a sheet-like structure made by knitting a thin fibrous material and a felt-like incombustible structure consisting of a comparatively thick fibrous material can be used. Among them, a honeycomb structure type carrier is preferable, and hereinafter, the carrier in which the catalyst component is coated on the surface of such a honeycomb structure type carrier is also referred to as a honeycomb structure type catalyst.

The honeycomb structure type carrier is not particularly limited, and can be selected from known honeycomb structure type carriers. Such carriers include flow-through type carrier and wall-flow type carrier used for DPF and CSF. As a carrier which is used only for purification of slip $NH_3$ in the subsequent stage of a selective catalytic reduction catalyst (SCR), the flow-through type carrier is preferable.

In addition, in such a honeycomb structure, its whole shape is also optional, and any one of columnar type, square pole type, hexagonal columnar type, and the like, can be selected depending on a structure of an exhausting system to be applied. Further, number of holes in the opening part may also be decided as appropriate considering kind of exhaust gas to be treated, flow rate of gas, pressure loss, removal efficiency, or the like, but, usually, is preferably around 10 to 1,500 holes per square inch, and particularly preferably 100 to 900 holes per square inch for purification of exhaust gas from diesel cars. When cell density is 10 cell/inch$^2$ or more, a contact area of exhaust gas and catalyst can be secured, and a sufficient exhaust gas purification performance can be obtained. And when cell density is 1,500 cell/inch$^2$ or less, performance of internal combustion engine is not impaired because significant pressure loss in exhaust gas does not occur.

In addition, in such a honeycomb structure type carrier, thickness of cell wall is preferably 2 to 12 mil (milli-inch), and more preferably 4 to 8 mil. In addition, material for the honeycomb structure type carrier is metals such as stainless steel, and ceramics such as cordierite.

It should be noted that, in the present invention, a sheet-like structure made by knitting a thin fibrous material and a felt-like incombustible structure consisting of a comparatively thick fibrous material can be used, but these monolithic structure type carriers different from the honeycomb structure type carrier can have a heightened treating ability compared with other structure type carriers, due to a greater amount of catalyst component to be supported and a larger contact area with exhaust gas, although back pressure might be heightened.

When the selective catalytic reduction type catalyst of the present invention is used in a coated state on the above-described flow-through type honeycomb carrier, a total coating amount of the catalyst for an upper layer and a lower layer per unit volume of the carrier is, in the case of a carrier having a number of holes in the opening part of 200 to 900 holes per square inch and a cell wall thickness of 4 to 8 mil, preferably 100 g/L or more, and more preferably 150 g/L or more, provided that a coating amount for the upper layer is 50% or more to that for the lower layer. In such coating state, NO oxidative function of the present invention is sufficiently exhibited, and a function as a selective catalytic reduction type catalyst is also sufficiently exhibited.

It should be noted that, as for upper limit of the coating amount, it is not particularly limited so long as the coating amount is within a range where any increase in production cost, clogging of honeycomb holes, and significant increase in back pressure of exhaust gas does not occur, however, considering these situations, the coating amount is desirably around 400 g/L or less, and more desirably 300 g/L or less, in the case of the above-described flow-through type honeycomb carrier.

In the catalyst of the present invention, as a material to compose the lower layer or the upper layer, besides the above-described materials, solid acid or binder, or the like can be used in combination. Such solid acid includes $WO_3/Zr$, $WO_3/$ Ti, $SO_3/Zr$, metallo-silicate, and the like. As a binder, alumina, silica sol, silica-alumina and zirconia are preferably used.

In the conventional catalysts, vanadium compound has been used as composite oxide with tungsten, titanium, and the like for a component of selective catalytic reduction catalyst. However, vanadium is exhausted to the atmosphere by exhaust gas due to its high volatility, and vanadium exhausted to the atmosphere could exert a serious influence on human health. Therefore, in the present invention, a harmful heavy metal component such as vanadium compound is not contained in the SCR component of the catalyst.

Thickness of each layer may be 5 to 200 μm, but desirably thickness of the upper layer is 40 to 120 μm, and thickness of the lower layer is 5 to 80 μm. Thickness of each layer may be uneven but preferably within the above-described range. When thickness of each layer is too thin, a function as the layer can be hardly exhibited because of insufficient catalyst component and decreased diffusion of gas component. When thickness of each layer is too thick, gas diffusion excessively increases, reaction or transfer of components becomes difficult to balance with the layer.

In addition, when a honeycomb structure is used as a carrier, although it depends on its cell density, if a honeycomb structure having a practical cell density is used, too thick a layer could increase back pressure and impair a performance of the combustion engine.

In addition, as for the lower layer, when the catalyst of the present invention is used in a coated state on a permeable structure carrier such as ceramics, a component of the lower layer may penetrate and whole or a part of the lower layer may be unified with the structure carrier. In addition, the structure carrier may be formed with a component of the lower layer and a component of the upper layer may be coated thereon. It should be noted that, in certain case, a bottom layer is provided between the lower layer and the structure carrier, intending to improve adhesion of the catalyst layer, and in this case, relation of the bottom layer and the lower layer is same to the above-described relation of the structure carrier and the lower layer.

FIG. 1 is a pattern diagram briefly showing formation of the selective catalytic reduction type catalyst of the present invention. In the present invention, a lower-layer catalyst layer (A) having an oxidative function is formed on a monolithic structure type carrier such as honeycomb carrier, and the upper-layer catalyst layer (B) having a reducing function is arranged on this oxidative function layer. In FIG. 1, catalyst layer is composed only by two layers of the upper layer and the lower layer. Such composition having no third layer between the upper and the lower layers is advantageous for gas diffusion, and effective for supplying or exhausting components necessary for reactions such as $NH_3$, $NO_2$ between the layers. However, the present invention is not limited to the composition of the pattern diagram, and an additional coating layer may be provided between the layers, between the structure carrier and the lower layer and on the surface of the upper layer, etc. for the purposes of delamination measure, sulfur poisoning measure, denitration promotion measure, purification of other exhaust gas component, and the like. However, the layer which is provided additionally should not impair the effect of the present invention. It should be noted that, although catalytic promoter component and binder are not illustrated in FIG. 1 for simplicity, it is obvious that these components can be used as appropriate.

Although the reason why the catalyst of the present invention exhibits a purification (oxidation) performance for $NH_3$ and a purification performance for $NO_x$ is not clear, FIG. 1 shows a modeled scheme assuming that a denitration reaction is promoted mainly via the following three reaction routes. As shown by the arrow mark (1) in FIG. 1, NO and $NO_2$ in exhaust gas flow into the selective catalytic reduction type catalyst (SROC), and $NH_3$ is supplied.

Outlines of the reaction routes consist of firstly "a reaction route in which $NO_x$ component such as NO, $NO_2$ and $NH_3$ as a reducing agent are supplied to SCR component (zeolite) in the upper layer, and $NO_x$ is exhausted as $N_2$ and $H_2O$ (not shown in the drawing)", secondly "a reaction route in which NO arrived at the lower layer passing through the upper layer is oxidized to $NO_2$ by a noble metal component (Pt), and this $NO_2$ transfers to the upper layer, to contact with the SCR component and react with $NH_3$ adsorbed and held on the SCR component in the upper layer, then is exhausted as $N_2$ and $H_2O$ ("SCR route: A" shown by dotted line in FIG. 1)", and thirdly "a reaction route in which NO arrived at the lower layer is oxidized to $NO_2$ by a noble metal, and this $NO_2$ is supplied to the SCR component in the lower layer to react with $NH_3$ adsorbed and held on the SCR component in the lower layer, then is exhausted as $N_2$ and $H_2O$ (not shown in the drawing) ("SCR route: B" shown by solid line in FIG. 1)".

In the reaction routes via a noble metal in FIG. 1, the reaction of $NO_2$ and $NH_3$ is higher in reactivity compared with the reaction of NO and $NH_3$, and in FIG. 1, the denitration reaction is promoted by oxidizing NO to $NO_2$ involving Pt, which is supplied to each SCR component (zeolite) in the upper and the lower layers.

In the present invention, positional relation of the noble metal component and the SCR component is also an important point in view of composition. In the catalyst of the present invention, the noble metal component is contained only in the lower layer but not in the upper layer. This is because of the following reason namely, since the noble metal component such as platinum is superior in a function to promote oxidation reaction for a reducing component, if the noble metal component is present in the upper layer of a selective reduction oxidation catalyst, a reaction between $NH_3$ and oxygen in exhaust gas preferentially proceeds to a reaction between $NH_3$ in the SCR component and $NO_x$, and additional $NO_x$ derived from $NH_3$ is generated and exhausted as it is without being reduced. Since the noble metal component in the present invention is contained only in the lower layer, even when additional $NO_x$ derived from $NH_3$ is generated in the lower layer, and this additional $NO_x$ is not completely reduced in the lower layer, this additional $NO_x$ is purified by passing through the upper layer, and not exhausted as it is without being reduced.

It should be noted that, the catalyst containing noble metal component has been conventionally used as a selective catalytic reduction (SCR) catalyst. However, in the conventional method of use, $NO_x$ derived from oxidation of $NH_3$ was generated, and also $NH_3$, which should be essentially used by the SCR component, has been consumed on a noble metal. Therefore, in order to obtain a sufficient denitration performance, an excess amount of $NH_3$ component assuming $NH_3$ to be consumed by noble metal was required to be supplied. However, supply of an excess amount of $NH_3$ was accompanied by a risk that slip $NH_3$, which was exhausted without being used for denitration reaction, was generated. In the present invention, since locations of the noble metal component and the SCR component are different from those in the conventional catalyst, and the noble metal component is not present in the upper layer, such problem does not occur.

One more point is that the zeolite component (iii), which selectively reduces $NO_x$, is present as well as the noble metal component (i) in the lower layer. In the present invention, although the noble metal component is present only in the lower layer, the noble metal component adsorbs and oxidizes $NH_3$ resulting in generation of $NO_x$ derived from $NH_3$. Since the noble metal component such as platinum and the SCR component coexist only in the lower layer, $NO_x$, which is generated on the noble metal component and derived from $NH_3$, is more immediately reduced using $NH_3$ adsorbed and stored on the SCR component as a reducing agent.

In addition, in this case, most part of $NH_3$ are oxidized by a strong oxidation promoting action of the noble metal component, and supplied to the SCR component (zeolite) as $NO_2$. $NO_2$ which contacts with the SCR component (zeolite) is immediately reduced due to superior reactivity with $NH_3$, and inhibit generation and exhausting of $NO_x$ derived from $NH_3$ as it is.

In addition, the selective catalytic reduction type catalyst (SROC) of the present invention also exhibits a superior effect on purification performance for $NO_x$ in low temperatures. The reason why purification performance for $NO_x$ does not deteriorate even when temperature of exhaust gas is low is not clear, but it is considered as follows, because of an action of a noble metal in the catalyst, concentration of $NO_2$ in $NO_x$ increases and reactivity with $NH_3$ is improved.

According to the present invention, due to an action of a noble metal having an oxidizing activity, NO among $NO_x$ components in exhaust gas is oxidized and converted to $NO_2$ which has a better reactivity, then supplied to a reaction with $NH_3$, and this leads to improvement of purification performance for whole $NO_x$.

2. Selective Catalytic Reduction (SCR) Catalyst

The above-described selective catalytic reduction type catalyst (SROC) of the present invention is a selective reduction oxidation catalyst which purifies nitrogen oxides in exhaust gas exhausted from lean combustion engines using ammonia or urea as a reducing agent, wherein the catalyst has a lower-layer catalyst layer (A) having an oxidative function for nitrogen monoxide (NO) in exhaust gas and an upper-layer catalyst layer (B) having an adsorbing function of ammonia both on the surface of the monolithic structure type carrier (C), and the lower-layer catalyst layer (A) comprises the components of (i), (ii) and (iii), on the other hand, the upper-layer catalyst layer (B) comprises substantially none of the component (i) but the component (iii), and can be utilized as a selective catalytic reduction (SCR) catalyst for purification of nitrogen oxides in exhaust gas exhausted from lean combustion engines using ammonia or urea as a reducing agent.

From a lean combustion engine such as diesel engines, $NO_x$ is exhausted by lean combustion at a high temperature. SCR catalyst is such a catalyst that is used for purifying $NO_x$ by supplying a reducing agent together with exhaust gas to the selective catalytic reduction catalyst. In such SCR, HC, aldehyde or $NH_3$ component is used as a reducing agent, and SCR exhibits a superior effect when $NH_3$ component is used. Hereinafter, SCR means SCR using $NH_3$ as a reducing agent.

In the SCR catalyst, known materials can be used, and constituents of the SCR catalyst which are preferably used in the present invention are the above-described component (iii) as an essential component; the component (i), that is, one or more kinds of noble metals selected from platinum, palladium or rhodium as an optional component; and the component (iii), that is, one or more kinds of oxides selected from alumina, titania, silica, zirconia, tungsten oxide, transition metal oxides, rare earth oxides, or composite oxides thereof; and the like, thus, similar components to those of the above-described selective reduction oxidation catalyst (SROC) of the present invention can be used. However, the SCR differs from the SROC in that the SCR does not have oxidative function, therefore, among the components to be contained in the lower layer (A), a less amount of the component (i) is desirably contained. Specifically, in the case when the lower-layer catalyst layer component of the present invention is coated on a monolithic structure type carrier, an amount of platinum to be used per unit volume of the monolithic structure type carrier is preferably 0.01 g/L or less, and more preferably 0.005 g/L or less.

3. Production Method for Selective Catalytic Reduction Type Catalyst

Preparation of the Selective Catalytic Reduction Type catalyst of the present invention is carried out by preparing firstly a lower-layer catalyst materials, an upper-layer catalyst layer materials and a monolithic structure type carrier. These catalyst materials subjected to making a slurry mixture by mixing together with aqueous medium and additives such as binder, surfactant if necessary, then coating the mixture on the monolithic structure type carrier, followed by drying and calcining. Namely, the catalyst materials and aqueous medium are mixed in a prescribed ratio to obtain a slurry mixture. In the present invention, the aqueous medium may be used in such an amount that each catalyst component can be dispersed uniformly in the slurry mixture.

The lower-layer catalyst materials comprise a metal catalyst component including noble metals of the component (i), an inorganic base material selected from alumina, titania, silica, zirconia, tungsten oxide, transition metal oxides, rare earth oxides, or composite oxides thereof of the component (ii), and zeolite of the component of (iii). The noble metal of the component (i) can be supported by the inorganic base material of the component (ii) in advance. The metal catalyst component, the inorganic base material and zeolite are mixed in an aqueous medium to prepare a slurry mixture. Aside from this, the upper-layer catalyst material comprises zeolite of the component (iii) as an essential component, and the inorganic base material of the component (ii) is compounded thereto if necessary.

In preparation of the lower-layer catalyst layer materials, when a noble metal of the component (i) is supported by an inorganic base material of the component (ii) in advance, any known method may be employed as appropriate, and an example is the following.

Firstly, as a raw material of the noble metal component, a compound such as nitrate salt, sulfate salt, carbonate salt, acetate salt, specifically, platinic (IV) chloride, diammine platinum (II) nitrite, hydroxyplatinic acid amine solution, platinic chloride, dinitrodiammine palladium, palladium nitrate, palladium chloride, rhodium (III) chloride, rhodium (III) nitrate, is prepared. A necessary compound is selected from these compounds and dissolved in water and an organic solvent to prepare a solution of a noble metal component material. It should be noted that, hereinafter, water or solvent added with a water-miscible organic solvent into water is referred to as an "aqueous medium".

Next, the solution of this noble metal component material is mixed together with an inorganic base material and an aqueous medium, subsequently dried at 50 to 200° C. to remove the solvents, then calcined at 300 to 1,200° C. It should be noted that, besides the above essential components, known catalyst material may be compounded thereto as oxygen storage component, base material, binder, and the like. Such a known catalyst material includes cerium-zirconium type composite oxide, cerium oxide, titania, zirconia, zeolite, alumina, silica, silica-alumina, alkali metal material, alkaline earth metal material, transition metal material, rare earth metal material, rhodium, rhodium salt, silver, silver salt, and the like, and dispersing agent, binder and pH adjuster may be used together, if necessary.

Coating of the catalyst composition on a monolithic structure type carrier is carried out by preparing a slurry mixture of the catalyst composition. Coating method is not particularly limited, but washcoat method is preferable. After coating, by drying and calcining, a monolithic structure type carrier supporting the catalyst composition can be obtained. It should be noted that drying temperature is preferably 100 to 300° C., and more preferably 100 to 200° C. In addition, calcining temperature is preferably 300 to 700° C., and particularly preferably 400 to 600° C. As for heating means, known heating means such as electric furnace, gas furnace, etc. can be used.

As in the selective catalytic reduction type catalyst (SROC) in the present invention, forming of multilayer of catalyst compositions on a monolithic structure type carrier may be carried out by repeating the procedures of coating of material, drying and calcining twice or more for each layer. In addition, any of a method in which after two times of successive coating for the lower-layer catalyst layer material and the upper-layer catalyst layer material by washcoat method, drying and calcining is carried out one time, or a method in which after coating of the lower-layer catalyst layer material by washcoat method and drying, material of second layer or later is coated thereon then dried and calcined, may be employed. In addition, a method may be employed in which after coating a slurry mixture containing a precursor of each catalyst material, drying and calcining the monolithic structure type carrier to complete the monolithic structure type carrier of the present invention.

When a catalyst composition is coated on a honeycomb monolithic structure type carrier having a polygonal shape, thickness of the layer is, though it may vary depending on each portion, preferably in a range of 5 to 200 µm, and particularly preferably in a range of 10 to 150 µm, both in upper layer and lower layer substantially in most portions.

When thickness of the upper layer is as thin as less than 5 µm, gas diffusion decreases. In addition, when total thickness of both layers is as thick as over 200 µm, and the catalyst composition of the present invention is coated on a honeycomb monolithic structure type carrier usually used, there is a fear that an engine receives excessive load due to increased pressure loss. Particularly preferable thickness is 40 to 120 µm for the upper layer, and 5 to 80 µm for the lower layer.

4. Exhaust Gas Purification Catalyst Equipment, and Purifying Process Using the Same In the present invention, an exhaust gas purification catalyst equipment can be constructed by arranging only the above-described selective catalytic reduction type catalyst having an oxidative function layer (SROC) in a flow path of exhaust gas, and a spraying means to supply an urea aqueous solution or an aqueous ammonia solution in the upstream side thereof.

However, since SROC of the present invention is a catalyst in which $NO_2$ having superior reactivity with $NH_3$ is effectively used for purifying $NO_x$, it is preferable to arrange an oxidation catalyst (DOC) in the preceding stage in a flow path of exhaust gas to obtain a combination of "DOC+SROC". DOC not only oxidizes NO but also purifies carbon monoxide (CO), hydrocarbon (HC) and a part of particle component in exhaust gas by oxidation and combustion.

Namely, this exhaust gas purification catalyst equipment arranges an oxidation catalyst (DOC) having an oxidative function for nitrogen monoxide and hydrocarbon in a flow path of exhaust gas, and a selective catalytic reduction type catalyst (SROC) having an oxidative function layer in the subsequent stage thereof, and further arranges a spraying means to supply an urea aqueous solution or an aqueous ammonia solution in the downstream of said oxidation catalyst and in the upstream of said selective catalytic reduction type catalyst.

Namely, the purifying process of exhaust gas of the present invention is characterized by comprising; using this exhaust gas purification catalyst equipment; passing exhaust gas exhausted from lean combustion engines through said oxidation catalyst (DOC) to convert nitrogen monoxide in exhaust gas to nitrogen dioxide; subsequently supplying by spraying an urea aqueous solution or an ammonia component thereto; then passing the exhaust gas through said selective catalytic reduction type catalyst (SROC) to reduce and purify nitrogen oxides in the exhaust gas.

(Purification of $NO_x$)

In the purification of $NO_x$ in exhaust gas, main actions thereof are as follows namely, by arranging the catalyst of the present invention in a flow path of exhaust gas exhausted from lean combustion engines such as diesel engine, NO in the exhaust gas is converted to $NO_2$ by the action of the catalyst of the present invention and content of $NO_2$ component in $NO_x$ is increased. It has been conventionally believed that NO is preferably oxidized in advance because $NO_2$ in $NO_x$ components has a higher reactivity with $NH_3$ than NO (Catalysis Today, 114 (2006), 3-12 (page 4, left column). In the present invention, utilizing this difference in reactivity effectively, purification performance for $NO_x$ is enhanced by arranging DOC in the preceding stage to convert NO component in exhaust gas to $NO_2$ having a higher reactivity with $NH_3$, and increase $NO_2$ concentration in $NO_x$, subsequently supplying to the SROC of the present invention.

The exhaust gas in which content of $NO_2$ component is thus increased is supplied with an ammonia component, then contacts with a selective catalytic reduction type catalyst arranged in the subsequent stage of the DOC catalyst, and $NO_x$ in the exhaust gas is purified. Here, supply of an ammonia component may be carried out by directly spraying an aqueous $NH_3$ solution into a flow path of exhaust gas, but desirably carried out by supplying as an urea aqueous solution from the viewpoints of safety and easiness in handling. The urea aqueous solution may be directly supplied into a flow path of exhaust gas, or may be supplied after reforming as appropriate to more reactive $NH_3$ before or during spraying into a flow path of exhaust gas. By thus arranging the catalysts, $NO_x$ can be efficiently purified according to the assumed reaction route shown in FIG. 1.

(Layout of "DOC+SCR Catalyst+SROC")

This layout is the one in which SCR catalyst is added to the above layout of "DOC+SROC". The SROC of the present invention is arranged in the subsequent stage of the known SCR catalyst in a flow path of exhaust gas due to having superior $NH_3$ purification function, and oxidizes slipped $NH_3$ from SCR.

Namely, this exhaust gas purification catalyst equipment arranges an oxidation catalyst (DOC) having an oxidative function for nitrogen monoxide and hydrocarbon in a flow path of exhaust gas, and a selective catalytic reduction type catalyst (SROC) having an oxidative function layer in the subsequent stage thereof, and further arranges a spraying means to supply an urea aqueous solution or an aqueous ammonia solution in the downstream of said oxidation catalyst and in the upstream of said selective catalytic reduction type catalyst, as well as further arranging a selective catalytic reduction (SCR) catalyst having substantially no oxidative function layer in the upstream of the selective catalytic reduction type catalyst (SROC) and in the downstream of said spraying means.

And the purifying process of exhaust gas is carried out by comprising; using this exhaust gas purification catalyst equipment; passing exhaust gas exhausted from lean combustion engines through said oxidation catalyst (DOC) to convert nitrogen monoxide in exhaust gas to nitrogen dioxide; subsequently supplying by spraying an urea aqueous solution or an ammonia component thereto; then passing the exhaust gas through said selective catalytic reduction catalyst (SCR) to reduce nitrogen oxides in the exhaust gas; further passing the exhaust gas through said selective catalytic reduction type catalyst (SROC) to oxidize and purify surplus ammonia in the exhaust gas.

Thus, by arranging the SROC of the present invention in the subsequent stage of the SCR catalyst to purify slip $NH_3$, purification of $NO_x$ is further, improved. Arranging of the known SCR catalyst in the subsequent stage of the SROC increases a capacity of the SCR in total and also increases purification performance for $NO_x$. In addition, also in purification of slipped $NH_3$, since the SROC of the present invention exhibits a superior SCR action as mentioned above, $NO_x$ which could not completely purified in the front SCR can be purified by effectively utilizing the slipped $NH_3$.

In addition, temperature of exhaust gas exhausted from diesel engines for automobile varies in a wide range. Assuming that the temperature is classified into a lower temperature range of approximately 150 to 250° C. and a higher temperature range of approximately 300 to 600° C., the SCR catalyst using no noble metal has been said to have a problem that the catalyst tends to exhibit insufficient activity in the lower temperature range although exhibit a superior activity in the higher temperature range. Since the SROC of the present invention has a superior activity even in the lower temperature range, by selecting the SCR catalyst having a superior denitration performance in higher temperature range and arranging the catalyst in the preceding stage, a high denitration performance in a wide temperature range from the lower temperature range to the higher temperature range can be exhibited.

(Layout of "DOC+DPF+SROC")

This layout is the one in which a filter (DPF) is added to the above layout of "DOC+SROC".

In exhaust gas exhausted from diesel engines, a combustible particle component is contained in addition to $NO_x$. Main components of this combustible particle component are soluble organic fraction (SOF) and soot. As a method for removing such combustible particle component, a method has been disclosed in which the component is filtered out from exhaust gas using a filter (see: JP-A-09-53442). Since $NO_2$ is effectively used by combustion of combustible particle component, conventionally the filter had been arranged as "DOC+DPF". However, this layout of "DOC+DPF" is a combination of a reaction of oxidation system and a reaction of combustion system, and in the exhaust gas exhausted from the subsequent stage thereof contains a large amount of NO component.

Therefore, by arranging the SROC of the present invention as in the layout of "DOC+DPF+SROC", the combustible particle component and $NO_x$ can be removed simultaneously and effectively It should be noted that, as for DPF, it may be simply the one having only a filtering function, but may be the one which has a catalyzing function by compounding Pt, Pd, and the like to promote combustion of the particle component.

Purification of $NO_x$ in exhaust gas by using the SROC of the present invention is carried out by supplying a urea aqueous solution or an aqueous ammonia solution in the preceding stage of the SROC of the present invention. In removal of the harmful particle component deposited on the filter, a fuel is supplied from the front side of the oxidation catalyst (DOC). A for supplying a fuel includes, besides direct spraying into a flow path of exhaust gas, supplying after separately vaporizing by heating or reforming as appropriate. In the case of purification of exhaust gas exhausted from diesel engines, a fuel component to be supplied is light oil. The fuel component supplied into a flow path of exhaust gas has a contact with the catalyst of the present invention together with NO. By this procedure, exhaust gas is heated up, NO is converted to $NO_2$, and content of $NO_2$ in $NO_x$ increases.

The exhaust gas thus reformed has a contact with harmful particle component collected by the filter which is arranged in the subsequent stage of the catalyst of the present invention, and the harmful particle, component is removed by combustion by virtue of heat, $NO_2$, and in some cases oxygen remaining in the exhaust gas, to regenerate the filter.

As for an exhaust gas atmosphere of an automobile, content of HC or its composition varies every hour depending on its controlling conditions and operating conditions. Even in such situation, by using the layout of the present invention, superior oxidizing performance and heat generation performance can be maintained. And by using DOC and DPE in combination, the harmful particle component can be combusted at a high efficiency, regeneration of the filter can be carried out, $NO_x$ in exhaust gas can be purified, and $NH_3$ slip can be inhibited.

(Other Catalyst Layout)

When the selective catalytic reduction type catalyst of the present invention is used for automobiles, the catalyst can be used in combination with a catalyst which exhibits other action. Examples of its layout are illustrated below including those described above. It should be noted that, in the following illustrations, an oxidation catalyst is represented by DOC, the selective catalytic reduction type catalyst of the present invention is represented by SROC, a known selective catalytic reduction catalyst is represented by SCR, a filter filtering out soot or soluble particle component in exhaust gas is represented by DPF (including DPF coated with oxidation catalyst).

It should be noted that, "($NH_3$)" represents a position where an urea aqueous solution, an aqueous ammonia solution, or the like as a reducing agent is supplied by spraying. In addition, the $NH_3$ component used in the present invention may be, in addition to an urea aqueous solution, an aqueous ammonia solution, or the like which is supplied by spraying, a component that is self-generated using a certain component in exhaust gas or a fuel component together with a catalyst arranged in the preceding stage of SCR or SROC, or aldehyde which could be generated when a biofuel is used. It should be noted that, even when the reducing component is self-generated as described above, another reducing component may be separately supplied by spraying from outside, if necessary.

Example of layout (1): DOC+($NH_3$)+SROC
Example of layout (2): DOC+($NH_3$)+SCR+SROC
Example of layout (3): DOC+DPF+($NH_3$)+SROC
Example of layout (4): DOC+DPF+($NH_3$)+SCR+SROC
Example of layout (5): DOC+($NH_3$)+SROC+DPF
Example of layout (6): DOC+($NH_3$)+SCR+SROC+DPF
Example of layout (7): DOC+($NH_3$)+SROC+DOC+DPF Example of layout (8): DOC+(NH$_3$)+SCR+SROC+DOC+DPF

EXAMPLES

Hereinafter, the features of the present invention will be further clarified by showing Examples and Comparative Examples. It should be noted that the present invention is not limited to the embodiments of these Examples. It should be noted that the catalysts used in Examples and Comparative Examples were prepared according to the methods described below.

[Production of SROC (1)]
=Lower Layer (Catalyst Layer Having an Oxidative Function for NH$_3$)=

Titania powder (BET value: 100 m$^2$/g) as a base material was impregnated with an aqueous platinic chloride solution as a raw material of noble metal component to support platinum (2.5% by weight in Pt equivalent), and the mixture was further added with water, β-type zeolite ion-exchanged with iron element (concentration: 2% by weight in iron element equivalent, ion-exchange percentage: 70%, SAR=40), and silica as a binder to adjust concentration, then milled in a ball mill to obtain a slurry of NH$_3$-oxidation catalyst part. This slurry was coated on a honeycomb flow-through type cordierite carrier (cell density: 300 cell/inch$^2$, wall thickness: 5 mil, length: 6 inch, diameter: 7.5 inch) by washcoat method, and the coated carrier was dried at 150° C. for 1 hour, then calcined at 500° C. for 2 hours under the atmospheric condition. Thickness of the lower layer was 20 to 120 μm.

=Upper Layer (SCR Layer)=

Subsequently, β-type zeolite ion-exchanged with iron element and cerium element (iron concentration: 2% by weight in iron element equivalent, ion-exchange percentage: 70%) (concentration: 0.1% by weight in cerium element equivalent, ion-exchange percentage: 5%) (SAR=40) and cerium oxide (BET value: 150 m$^2$/g), water, and silica as a binder were milled in a ball mill to obtain a slurry. This slurry was coated on the honeycomb flow-through type cordierite carrier which had been coated with the lower layer part by washcoat method. The carrier was dried at 150° C. for 1 hour, then calcined at 500° C. for 2 hours under the atmospheric condition.

Catalyst composition of the resultant SROC is shown in Table 1. The numerals in Table 1 represent supporting amounts per unit volume of honeycomb flow-through type cordierite carrier (g/L). Thickness of the upper layer was 40 to 120 μm.

[Production of SROC (2)]

The same procedures were repeated as in SROC (1) except that a part of the upper layer of SROC (1) was changed to MFI-type zeolite ion-exchanged with iron element (concentration: 2% by weight in iron element equivalent, ion-exchange percentage: 70%) to obtain SROC (2). Catalyst composition of the resultant SROC is shown in Table 1. Thicknesses are 20 to 120 μm for lower layer and 40 to 120 μm for upper layer. SROC, SCR and DOC prepared as described above were arranged in an exhaust gas pipe as shown below.

[Production of SCR]

As Comparative Example, SCR catalyst, which had a reducing layer not containing Pt as a lower layer, was obtained by the same procedures as in the above SROC (1). The resultant catalyst composition is shown in Table 1.

SROC, SCR and DOC prepared as described above were arranged in an exhaust gas pipe as shown below. Thicknesses are 20 to 120 μm for the lower layer and 40 to 120 μm for the upper layer.

[Production of Oxidation Catalyst (Doc) for Preceding Stage]

Alumina powder (BET value: 200 m$^2$/g) as a base material was impregnated with an aqueous platinic chloride solution as a raw material of noble metal component to support platinum (position change: 2.5% by weight in Pt equivalent), and the mixture was further added with water and cerium oxide powder (BET value: 150 m$^2$/g) to adjust concentration, then milled in a ball mill to obtain a slurry of oxidation catalyst to be used in the preceding stage. This slurry was coated on a honeycomb flow-through type cordierite carrier (cell density: 400 cell/inch$^2$, wall thickness: 6 mil, length: 7 inch, diameter: 7.5 inch) by washcoat method, and the coated carrier was dried at 150° C. for 1 hour, then calcined at 500° C. for 2 hours under the atmospheric condition. The resultant catalyst composition is shown in Table 1.

TABLE 1

Catalyst compositions of SROC (1), SROC (2), SCR and DOC

| | | Fe β-zeolite | Fe/Ce β-zeolite | Fe MFI | Ti-tania | Sil-ica | Ce-ria | Alu-mina | Pt |
|---|---|---|---|---|---|---|---|---|---|
| SROC (1) | Upper layer | 60 | 40 | | | | | | |
| | Lower layer | 30 | | | 40 | 40 | | | 1 |
| SROC (2) | Upper layer | 30 | 40 | 30 | | | | | |
| | Lower layer | 30 | | | 40 | 40 | | | 1 |
| SCR | Upper layer | 60 | 40 | | | | | | |
| | Lower layer | 30 | | | 40 | 40 | | | — |
| DOC | | | | | | | 55 | 85 | 2 |

Examples 1, 2

The selective catalytic reduction type catalyst of the present invention SROC (1) prepared as described above was arranged together with DOC in an exhaust gas pipe as shown below. (NH$_3$) represents a position of supplying an urea aqueous solution as an ammonia component by spraying.

Example 1: DOC+(NH$_3$)+SROC (1)
Example 2: DOC+(NH$_3$)+SCR+SROC (1)

Examples 3, 4

The selective catalytic reduction type catalyst of the present invention SROC (2) prepared as described above was arranged together with DOC in an exhaust gas pipe as shown below. (NH$_3$) represents a position of supplying an urea aqueous solution as an ammonia component by spraying.

Example 3: DOC+(NH$_3$)+SROC (2)
Example 4: DOC+(NH$_3$)+SCR+SROC (2)

Comparative Examples 1, 2

The known selective catalytic reduction (SCR) catalyst prepared as described above was arranged together with DOC in an exhaust gas pipe as shown below. (NH$_3$) represents a position of supplying a urea aqueous solution as an ammonia component by spraying.

Comparative Example 1: DOC+(NH₃)+SCR
Comparative Example 2: DOC+(NH₃)+SCR+SCR

In each group of "Example 1, Example 3 and Comparative Example 1" and "Example 2, Example 4 and Comparative Example 1", capacities of SCR and SROC were adjusted at an equivalent level to compare Examples of the present invention with Comparative Example.

<Evaluation of Catalyst Performance> (Slip Evaluation of $NO_x$ and $NH_3$)

Figure 2:
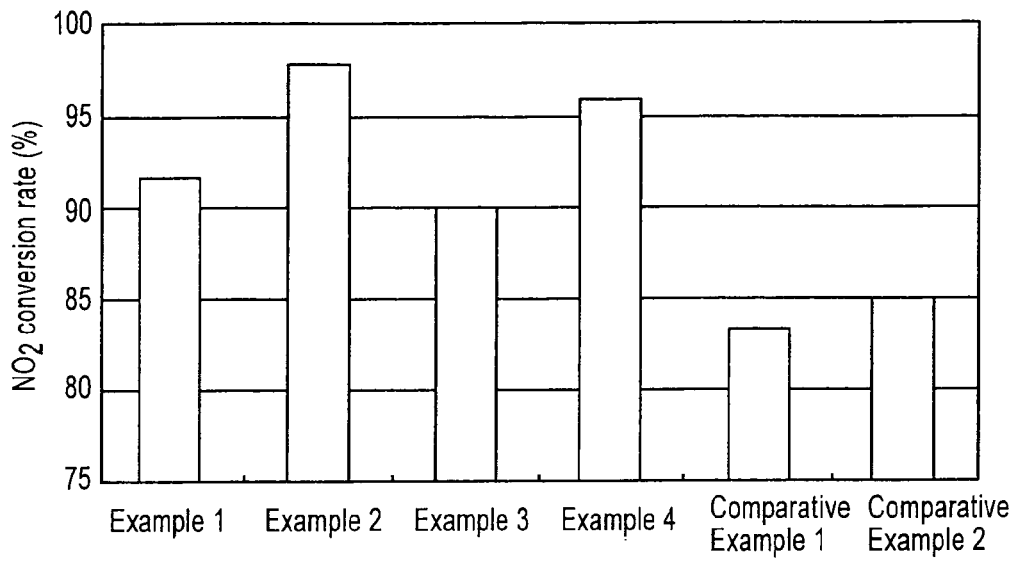
FIG. 2 is a graph representing conversion rates of $NO_x$ in Examples and Comparative Examples.
Figure 3:
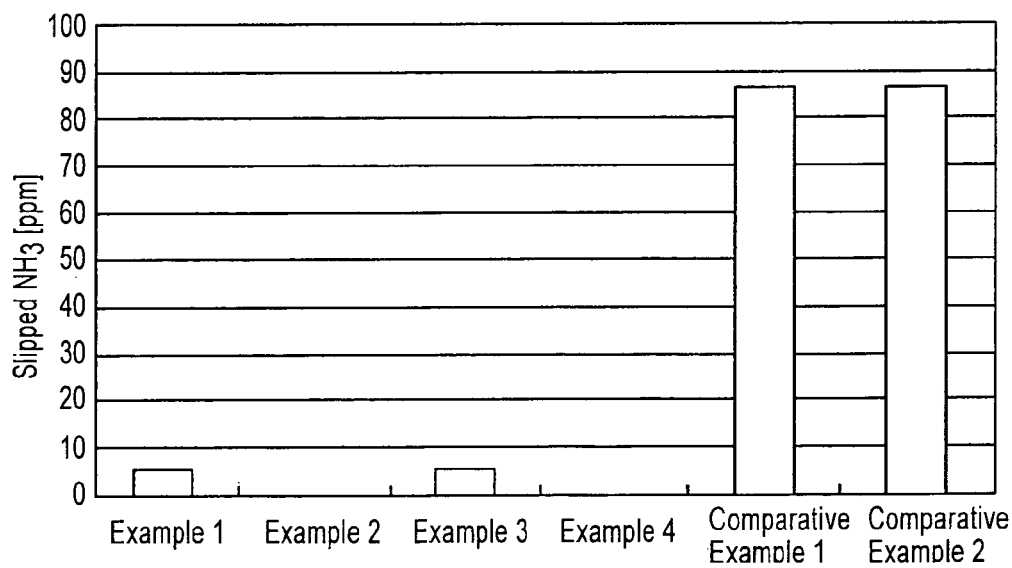
FIG. 3 is a graph representing concentrations of slip $NH_3$ in Examples and Comparative Examples.

For each of Examples and Comparative Examples, purification performance for $NO_x$ and concentration of slipped $NH_3$ were measured under the measuring conditions described below. Results of purification performance for $NO_x$ and concentration of slipped $NH_3$ are shown in FIG. 2 and FIG. 3, respectively. It should be noted that "(NH₃)" represents an ammonia component in the catalyst systems and a 32.5% urea aqueous solution was sprayed in each Example.

In FIG. 2, the Y-axis represents conversion rate of $NO_x$ in the catalyst system, and in FIG. 3, the Y-axis represents concentration of slipped $NH_3$. As for measurements of $NO_x$ and $NH_3$, concentration of each component contained in exhaust gas was measured after a lapse of 3 minutes from ignition of the engine, under the conditions where values of exhaust gas components and surface temperature of catalysts were stabilized.

<Measuring Conditions>
Engine: Diesel 5 L engine,
Number of revolutions: 2,500 rpm
Surface temperature of DOC: 300° C.
Surface temperature of SCR and each SROC: 280° C.
Space velocity: 150,000/hr
Amount of urea aqueous solution to be sprayed: ratio of $NH_3/NOx$ in exhaust gas was controlled at 1.5.

[Evaluation]

It can be understood that purification performance for $NO_x$ is superior in Examples using the selective catalytic reduction type catalyst of the present invention SROC (1) or (2) as shown in FIG. 2. In particular, in Example 2 and Example 4, a superior effect is exhibited by using in combination with the selective catalytic reduction catalyst SCR. This is a surprising result considering that a difference in performance between Comparative Example 1 and Comparative Example 2 is little, though amounts of the catalyst used were equivalent.

In addition, it can be understood from FIG. 2 that use of the selective catalytic reduction type catalyst of the present invention SROC (1) or (2) can also exhibit a superior purification performance for slipped $NH_3$. In this case again, a superior effect is exhibited by using in combination with SCR as in Example 2 and Example 4. Contrary to this, a difference in performance can be hardly observed between Comparative Example 1 and Comparative Example 2, though amounts of the catalyst used were equivalent.

What is claimed is:

1. An exhaust gas purification catalyst equipment formed by arranging an oxidation catalyst (DOC) having an oxidative function for nitrogen monoxide and hydrocarbon and a selective catalytic reduction type catalyst (SROC) having an oxidative function layer in the subsequent stage thereof, in a flow path of exhaust gas, and a spraying means to supply an urea aqueous solution or an aqueous ammonia solution is arranged in the downstream of the aforementioned oxidation catalyst (DOC) and in the upstream of aforementioned selective catalytic reduction type catalyst (SROC),
characterized in that the selective catalytic reduction type catalyst (SROC) comprises a lower-layer catalyst layer (A) having an oxidative function for nitrogen monoxide (NO) in exhaust gas and an upper-layer catalyst layer (B) having an adsorbing function for ammonia on the surface of a monolithic structure type carrier (C), and that the lower-layer catalyst layer (A) comprises the following components of (i), (ii) and (iii), and the upper-layer catalyst layer (B) comprises component (iii) and none of component (i),
(i) one or more kinds of noble metals selected from platinum, palladium and rhodium;
(ii) one or more kinds of oxides selected from alumina, titania, silica, zirconia, tungsten oxide, transition metal oxides, rare earth oxides, or composite oxide thereof; and
(iii) zeolite; and wherein the content of zeolite in the lower-layer catalyst (A) per unit volume of the monolithic type carrier (C) is 80 g/L or less; and wherein the content of zeolite in the upper-layer catalyst layer (B) per unit volume of the monolithic type carrier (C) is 100 to 160 g/L.

2. The exhaust gas purification catalyst equipment according to claim 1, characterized in that a selective catalytic reduction (SCR) catalyst having substantially no oxidative function layer is further arranged in the upstream of the aforementioned selective catalytic reduction type catalyst (SROC) having an oxidative function layer and in the downstream of the aforementioned spraying means.

3. The exhaust gas purification catalyst equipment according to claim 1, wherein the selective catalytic reduction (SCR) catalyst is characterized in that the component (i) in the lower-layer catalyst layer (A) comprises platinum as a noble metal component, and content thereof per unit volume of the monolithic type carrier (C) is 0.05 to 3 g/L.

4. The exhaust gas purification catalyst equipment according to claim 1, characterized in that content of the component (ii) in the lower-layer catalyst layer (A) per unit volume of the monolithic type carrier (C) is 5 to 80 g/L.

5. The exhaust gas purification catalyst equipment according to claim 1, characterized in that the component (iii) in the lower-layer catalyst layer (A) or the upper-layer catalyst layer (B) comprises β-type zeolite and/or MFI-type zeolite.

6. The exhaust gas purification catalyst equipment according to claim 1, characterized in that the component (iii) in the lower-layer catalyst layer (A) or the upper-layer catalyst layer (B) comprises at least one kind of iron component or cerium component.

7. The exhaust gas purification catalyst equipment according to claim 1, characterized in that content of the component (iii) in the lower-layer catalyst layer (A) per unit volume of the monolithic type carrier (C) is 5 to 80 g/L.

8. The exhaust gas purification catalyst equipment according to claim 1, characterized in that the lower-layer catalyst layer (A) or the upper-layer catalyst layer (B) further comprises the following component (iv) as a catalytic promoter component:
(iv) one or more kinds of oxides selected from rare earth oxides, transition metal oxides, tin oxide, or composite oxides thereof.

9. The exhaust gas purification catalyst equipment according to claim 1, characterized in that thicknesses of the lower-layer catalyst layer (A) and the upper-layer catalyst layer (B) are each substantially in a range from 5 to 200 μm.

10. The exhaust gas purification catalyst equipment according to claim 1, characterized in that the lower-layer catalyst layer (A) is coated on the monolithic structure type carrier (C), and directly thereon the upper-layer catalyst layer (B) is coated so as to be a top layer where directly contacts with the aforementioned exhaust gas flow.

11. A purifying process of exhaust gas using the exhaust gas purification catalyst equipment according to claim 1, the process comprising: passing exhaust gas exhausted from lean combustion engines through the aforementioned oxidation catalyst (DOC) to convert nitrogen monoxide in exhaust gas to nitrogen dioxide; subsequently supplying by spraying an urea aqueous solution or an ammonia component thereto; then passing the exhaust gas through the aforementioned selective catalytic reduction type catalyst (SROC) to reduce and purify nitrogen oxides in exhaust gas.

12. A purifying process of exhaust gas using the exhaust gas purification catalyst equipment according to claim 2, the process comprising: passing exhaust gas exhausted from lean combustion engines through the aforementioned oxidation catalyst (DOC) to convert nitrogen monoxide in exhaust gas to nitrogen dioxide; subsequently supplying by spraying an urea aqueous solution or an ammonia component thereto; then passing the exhaust gas through the aforementioned selective catalytic reduction catalyst (SCR) to reduce nitrogen oxides in the exhaust gas; further passing the exhaust gas through the aforementioned selective catalytic reduction type catalyst (SROC) to oxidize and purify surplus ammonia in the exhaust gas.

* * * * *